(12) United States Patent
Pankajakshan

(10) Patent No.: US 7,792,021 B1
(45) Date of Patent: Sep. 7, 2010

(54) SOLUTIONS FOR PREVENTING ROUTING LOOPS AND LOAD BALANCING WHEN CONNECTED TO A MULTIHOMED AUTONOMOUS SYSTEM

(75) Inventor: Bejoy Pankajakshan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 917 days.

(21) Appl. No.: 11/208,794

(22) Filed: Aug. 22, 2005

(51) Int. Cl.
*H04L 12/28* (2006.01)
*H04L 12/66* (2006.01)

(52) U.S. Cl. .................. 370/229; 370/254; 370/401; 370/463

(58) Field of Classification Search ........... 370/229, 370/235, 236, 230.1, 238, 252, 254, 351, 370/400, 401, 409, 431, 463; 709/220–226, 709/238, 243
See application file for complete search history.

(56) References Cited

U.S. PATENT DOCUMENTS

| | | | | |
|---|---|---|---|---|
| 7,075,933 B2 * | 7/2006 | Aysan | ................... | 370/401 |
| 7,286,479 B2 * | 10/2007 | Bragg | ................... | 370/238 |
| 7,529,254 B2 * | 5/2009 | Tsuge et al. | ................ | 370/401 |
| 7,551,551 B2 * | 6/2009 | Filsfils et al. | ................ | 370/219 |
| 7,702,765 B1 * | 4/2010 | Raszuk | .................. | 709/223 |
| 2006/0203744 A1 * | 9/2006 | Patel et al. | .................. | 370/254 |
| 2006/0215579 A1 * | 9/2006 | Nadeau et al. | ............. | 370/254 |
| 2006/0272018 A1 * | 11/2006 | Fouant | ...................... | 726/23 |
| 2006/0291445 A1 * | 12/2006 | Martini et al. | .............. | 370/351 |
| 2008/0316914 A1 * | 12/2008 | Vercellone et al. | ......... | 370/216 |

* cited by examiner

*Primary Examiner*—Aung S Moe
*Assistant Examiner*—Kerri M Rose

(57) ABSTRACT

MPLS Solution for multihomed autonomous system is implemented for preventing routing loops and load balancing in a network. Route import and export statements are modified to set routing policies in a virtual routing and forwarding table. IBGP routes are blocked while maintaining route selections to stub sites.

21 Claims, 8 Drawing Sheets

SOLUTIONS FOR PREVENTING ROUTING LOOPS AND LOAD BALANCING WHEN CONNECTED TO A MULTIHOMED AUTONOMOUS SYSTEM

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

This invention relates to the field of routing protocols in a packet network.

BACKGROUND OF THE INVENTION

The growth of the Internet has increased the burden of transferring data from one destination to another. As a result, various protocols have been developed to ease this burden, trying to keep pace with the increasing Internet use. Unfortunately, not all of these protocols have been successful.

In the beginning, the Exterior Gateway Protocol (EGP) was created to exchange routing information between two neighboring gateway hosts. It was commonly used between hosts on the Internet to exchange routing table information. However, EGP became less capable as the Internet structure grew and became too unmanageable. EGP could not handle the increased size of the Internet nor could it deal well with having multiple connections to unrelated routing domains.

With the limitations of EGP, the Border Gateway Protocol (BGP) appeared primarily designed to handle arbitrarily connected networks. This is the structure that remains today. There are hundreds of networks operating in the Internet. These networks are connected in an arbitrary fashion to other networks. So, in order to have some routing rules, BGP operates to view the various networks operating in the Internet as autonomous systems (ASs).

An AS may be defined as a network operating in the Internet as an independent entity. An AS may be a corporate network, university campus network, or a series of smaller networks connected together. For example, a corporation may have several locations linking all of its locations together in a single network. This single network may be viewed as an AS. Likewise, the corporation may have several as depending on the structure it has implemented.

Each AS has a globally unique autonomous system number (AS identifier) so that an entity can be located in the Internet. Each AS can talk to another AS using the AS identifier. An AS may be connected to another AS either through a service provider, connection point, or direct connection. These connections establish how data may route from one AS to another.

Of the various types of AS, three are commonly encountered: a multihomed AS, a transit AS, and a stub AS. A multihomed AS is one that has multiple connections to other ASs. A multihomed AS may be found in entities such as large corporations that need connections to other networks. A transit AS is one that has multiple connections to other as and also allows data to transfer through it enroute to another destination. A stub AS is one that has one connection to another AS.

BGP runs in two modes: Exterior (or External) Border Gateway Protocol (EBGP or eBGP) and Interior (or Internal) Border Gateway Protocol (IBGP or iBGP). EBGP operates between two different as while IBGP operates within the same AS.

During the advancement of the Internet, other protocols have been implemented to improve BGP. For example, Secure BGP (S-BGP) was created to address security issues, such as authenticity of routing, around BGP. Secure Origin BGP (soBGP) was created to improve S-BGP by allowing service providers to authenticate routes and implement a more flexible routing policy. External and Internal Border Gateway Protocol (eiBGP) was created to work with the Multiprotocol Label Switching (MPLS) Virtual Private Networks (VPNs). EiBGP allows one to configure multipath load balancing with both EBGP and IBGP paths in BGP networks.

Although not explicitly discussed here, a foundation of the protocols is a use of routers to communicate with each other to transfer data. BGP and its variations use routers to route data from one AS to another. The routers are associated with an AS or service provider, and operate with routing policies to transfer data from a source to a destination. Several types of routers exist including provider edge routers (PE-routers) which function at the boundaries of a backbone service provider, and consumer edge routers (CE-routers) that function at the boundaries of an AS. The backbone service provider and AS may have other internal routers, but it is the PE-routers and CE-routers that communicate together at the boundaries to transfer data from one AS to another AS.

When bi-directional load balanced communication is required between two multihomed ASs, there is a desire to implement eiBGP multipath on all the PE-routers. When this happens, traffic that leaves a PE-router destined for a set of PE-routers connected to an AS will be load balanced between the set of PE-routers. Without eiBGP multipath implemented, some PE-routers may become under-utilized. The goal is to be able to balance traffic across PE-routers. In doing so, a problem may occur in causing routing loops. A routing loop may occur when data traffic is sent back and forth between PE-routers that are connected to the same AS. A cause of the routing loop is attributed to a change in the routing policy whereby a critical route selection rule is negated in the PE-routers (i.e. "that eBGP learned routes must be preferred over iBGP learned routes") for the purposes of load balancing. Without this rule, eBGP routes and iBGP routes are made equal in the route selection process. Therefore, when a PE-router selects a route, it selects the route path with the closest distance or least cost. In most cases, this will be an iBGP route since the PE-routers are closer together in most cases or are connected to the same AS.

A solution is needed that would allow eiBGP multipath to be implemented on PE-routers but prohibit routing loops from occurring. The present invention implements this solution.

SUMMARY OF THE INVENTION

This disclosure describes, among other things, solutions for preventing routing loops when connected to a multihomed autonomous system (AS). MPLS Solution for a multihomed AS is implemented for preventing routing loops in a network. Route import and export statements are modified to set routing policies in a virtual routing and forwarding (VRF) table. IBGP routes are blocked while maintaining route selections to stub sites.

In accordance with the present invention, a method for preventing routing loops in a communications network is provided that includes receiving data at a first router, the first router being a member of a set of routers associated with an autonomous system (AS). Other routers are determined from the set of routers associated with the AS. The communication of the data is provided to a second router. The second router is not one of the other routers.

In another aspect, a method for preventing routing loops in a communications network is provided that includes implementing eiBGP multipath among PE-routers. IBGP routes are prevented between PE-routers where an autonomous system (AS) is multihomed to the PE-routers.

In yet another aspect, a method for preventing routing loops in an eiBGP-enabled packet network is provided that includes modifying route import statements in PE-routers to accept routes from each other but not accept routes between a set of the PE-routers connected to the same autonomous system (AS). A unique route export statement is provided to the PE-routers.

In yet another aspect, a method for preventing routing loops among multihomed autonomous systems (as) without blocking routes to stub sites is provided that includes, with eiBGP multipath enabled in PE-routers, modifying route import statements in a first virtual routing and forwarding (VRF) table in PE-routers to match across the PE-routers except where the PE-routers are connected to the same autonomous system (AS). A unique route export statement is provided to the PE-routers. A second VRF table is implemented to allow stub sites to route packets without restriction from the first VRF table.

In yet another aspect, a system for preventing routing loops in an eiBGP-enabled packet network is provided that includes PE-routers in communication with autonomous systems (ASs). The PE-routers operate to modify route import statements to match across the PE-routers except where a set of the PE-routers are connected to the same autonomous system (AS). The PE-routers operate to contain unique route export statements.

In yet another aspect, a system for preventing routing loops among multihomed autonomous systems (as) without blocking routes to stub sites is provided that includes PE-routers in communication with as where a first set of the PE-routers operate to enable eiBGP multipath when connected to the same autonomous system (AS). The PE-routers operate to modify route import statements in a first virtual routing and forwarding (VRF) table in the PE-routers to match across the PE-routers except where the PE-routers are connected to the same AS. The PE-routers operate to contain unique route export statements. A second set of the PE-routers operate to implement a second VRF table to allow stub sites to route packets without restriction from the first VRF table.

BRIEF DESCRIPTION OF THE SEVERAL
VIEWS OF THE DRAWINGS

The present invention is described in detail below with reference to the attached drawing figures, which are incorporated herein by reference, and wherein.

DETAILED DESCRIPTION OF THE INVENTION

Figure 1:
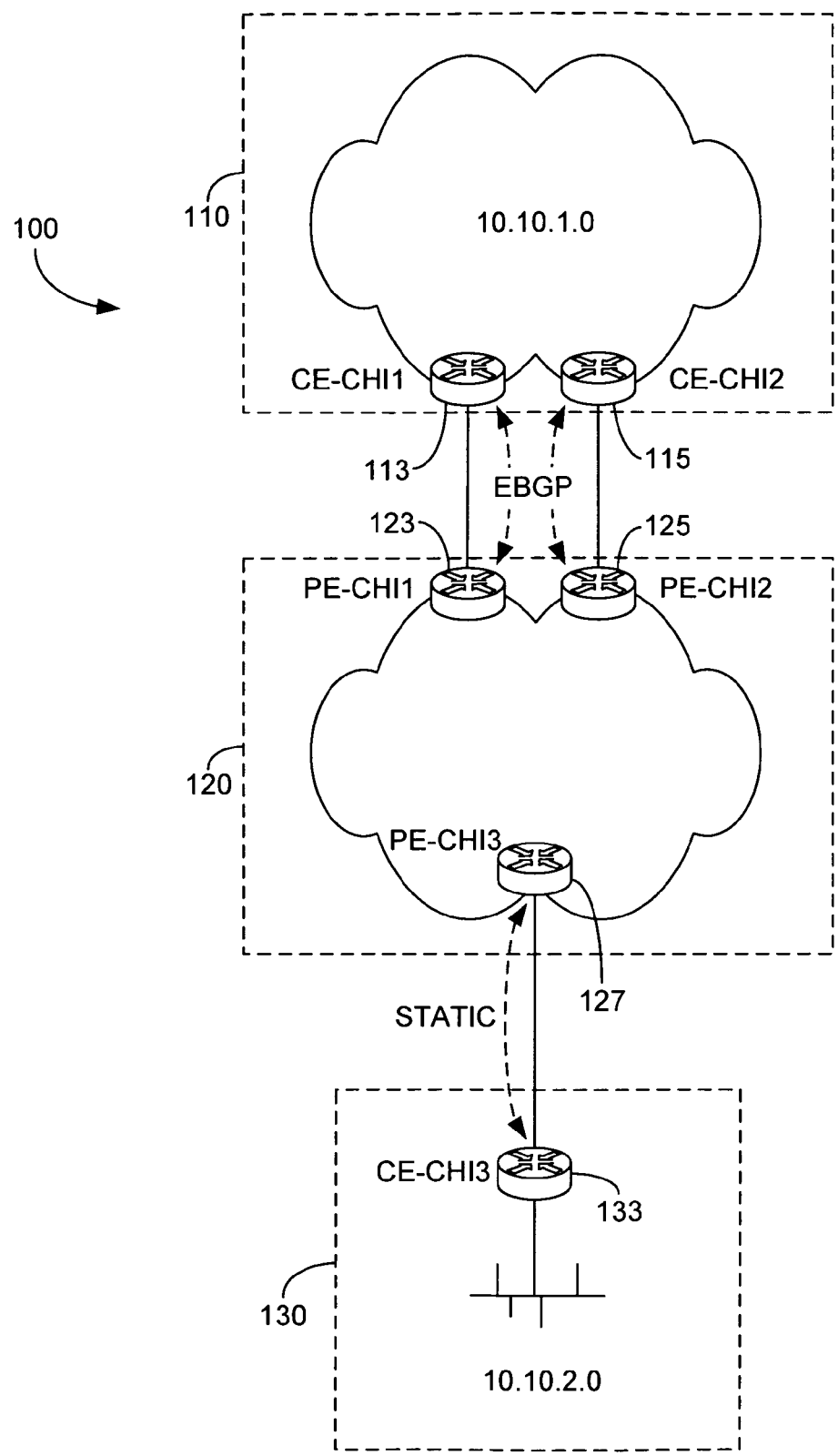
FIG. 1 is a block diagram of a first exemplary BGP network.

The present invention will be better understood from the detailed description provided below and from the accompanying drawings of various embodiments of the invention, which describe, for example, a method and system for preventing routing loops in a communication network, for preventing routing loops in an eiBGP-enabled packet network, and for preventing routing loops among multihomed autonomous systems (as) without blocking routes to stub sites. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

Solutions for MultiHomed AS

In FIG. 1, a block diagram of an exemplary BGP network is shown with an AS 110 and an AS 130 connected to a backbone service provider (SP) 120. AS 110 contains a CE-router 113 and a CE-router 115 that communicates with a PE-router 123 and a PE-router 125 in SP 120. A PE-router 127 communicates with a CE-router 133. AS 110 may communicate with AS 130 by routing packets of data through SP 120.

The CE-routers and PE-routers route packets of data using their route policy statements. The route policy statements determine how packets will be handled and routed when encountered by the routers. The route policy statements also allow the routers to advertise or broadcast the routes that they may handle so that other routers may know what routes are available. The route policy statements are located within a virtual routing and forwarding (VRF) table located in the CE-routers and PE-routers.

Figure 2:
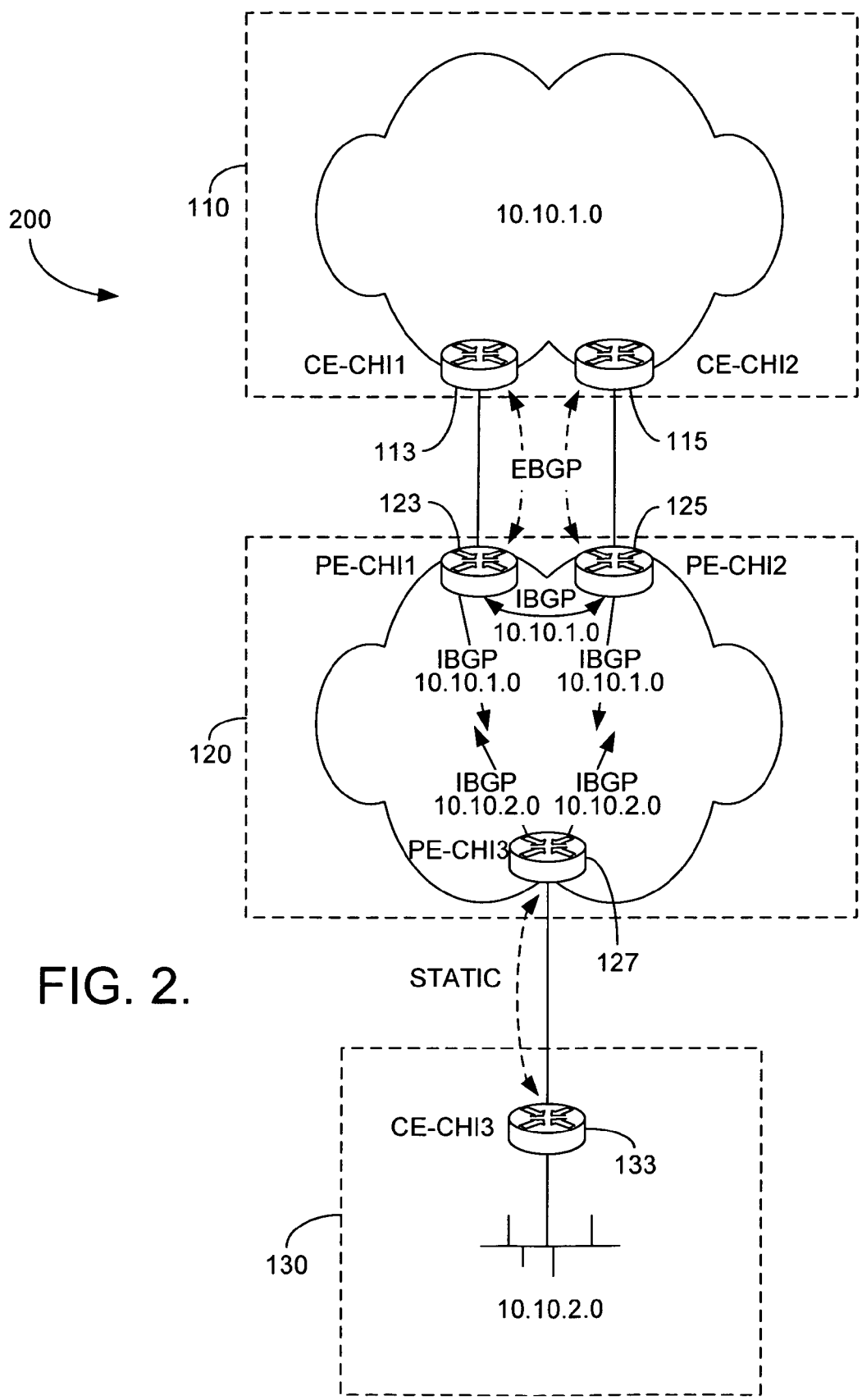
FIG. 2 is a block diagram of a second exemplary BGP network.

Turning now to FIG. 2, another block diagram of an exemplary BGP network is shown this time identifying routing paths within SP 120. Because SP 120 is similar to an autonomous system when it comes to BGP, the routers use iBGP to route their packet within SP 120. However, the routers would use eBGP to route their packets to another autonomous system.

In FIGS. 1 and 2, AS 110 is multihomed to PE-routers 123 and 125. This means that AS 110, through CE-routers 113 and 115, has multiple connections to reach one or more autonomous systems. In FIGS. 1 and 2, the connections are shown to PE-routers 123 and 125. Alternatively, AS 130 is not multihomed to another location. AS 130, through CE-router 133, has a static connection to PE-router 127.

It may be desired that packets destined from AS 130 to AS 110 be load balanced as they leave PE-router 127. This may be done by activating iBGP multipath in PE-router 127. iBGP multipath means that the router may install more than one iBGP route in its routing table. When iBGP multipath is enabled on PE-router 127, packets leaving PE-router 127 for AS 110 may be balanced between PE-router 123 and PE-router 125.

In some situations, iBGP multipath may not be sufficient due to the unequal cost load balancing among iBGP (and eBGP) routes. In this case, eiBGP multipath may be used to perform the load balancing of packets.

Figure 3:
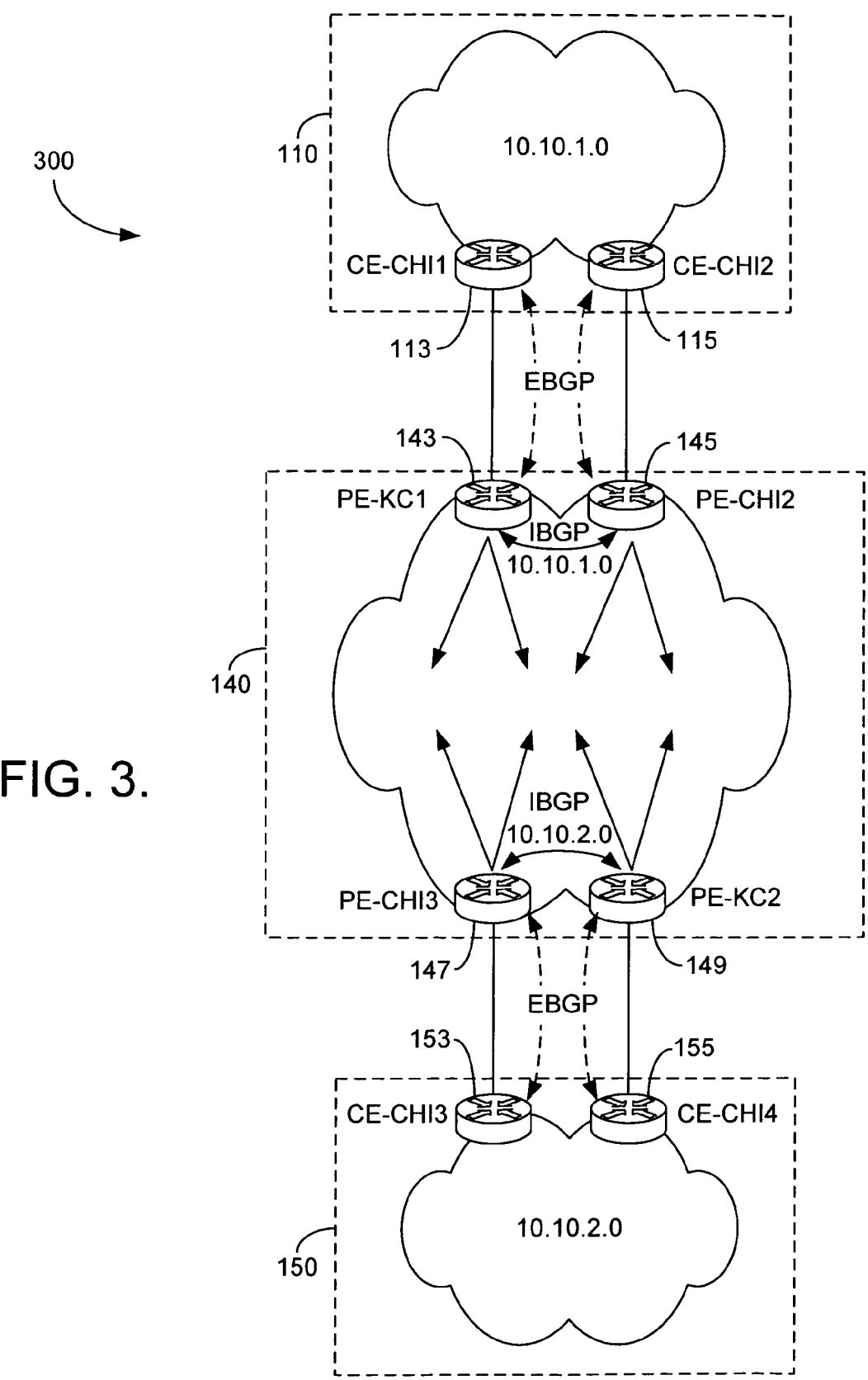
FIG. 3 is a block diagram of an exemplary eiBGP multipath network.

In FIG. 3, a block diagram of an exemplary eiBGP multipath network is shown in 300. An SP 140 and an AS 150 respectively replace SP 120 and AS 130 which were shown FIGS. 1 and 2. SP 140 has four PE-routers while SP 120 had three PE-routers. PE-routers 143, 145, 147 and 149 implement eiBGP multipath by allowing bi-directional load balancing as indicated by the arrows in SP 140. For example, packets may leave PE-router 143 destined for PE-routers 145, 147, and 149. By implementing eiBGP multipath, the goal may be to provide load balancing across unequal iBGP routes. AS 150 contains CE-routers 153 and 155 to communicate with PE-routers 147 and 149.

Figure 4:
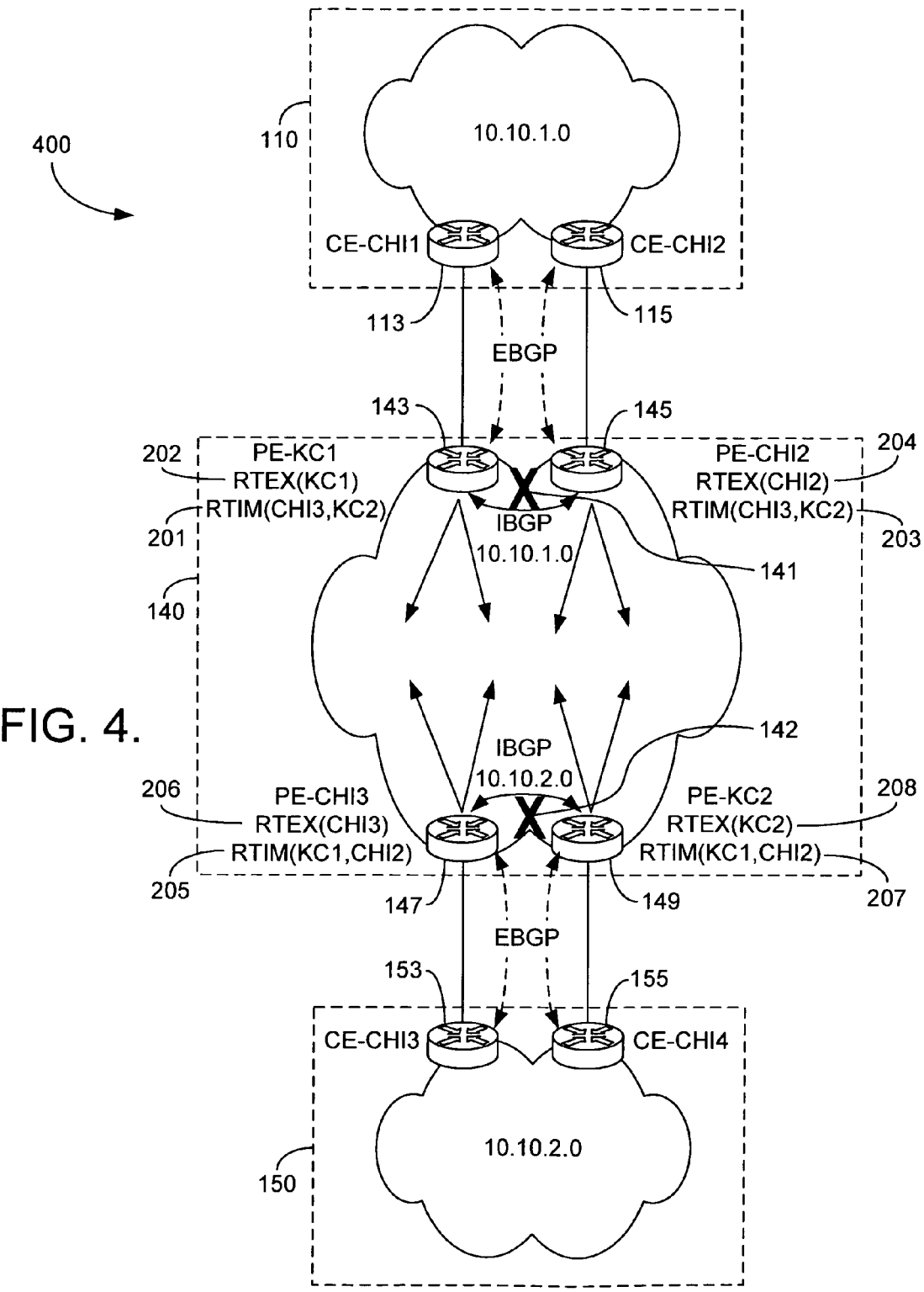
FIG. 4 is a block diagram of an exemplary routing loop prevention network suitable for practicing an embodiment of the present invention.

An undesired effect may occur in the routing policy of routers when eiBGP multipath is enabled. A critical route selection rule may be negated causing the routers to select routes that may send packets in a perpetual loop. The rule "eBGP learned routes must be preferred over iBGP learned routes" is designed to prevent the loop problem but cannot exist when eiBGP is enabled, thus, eBGP routes and iBGP routes appear equivalent in the routers. In FIG. 4, to prevent routing loops, route import and export statements may be controlled to prevent iBGP routes from occurring between PE-router 143 and PE-router 145, and between PE-router 147 and PE-router 149.

As shown in FIG. 4, route import and export statements have been modified to prevent routing loops. Whereas before, PE-routers 143, 145, 147, and 147 could import and export all routes between each other, an embodiment of the present invention changes the statements to control the routes. For example, with PE-router 143 before the implementation of the present invention, PE-router 143 could import and export routes from PE-routers 145, 147, and 149. This would be indicated by RTim (CHI2,CHI3,KC1,KC2) and RTex (CHI2, CHI3,KC1,KC2) which are not shown. In the present invention, the route import and export statements are changed for PE-router 143 to indicate RTim (CHI3,KC2) and RTex (KC1) which are shown respectively as 201 and 202 in FIG. 4. This means that PE-router 143 can accept routes from PE-routers 147 and 149, but not accept routes from PE-router 145 as indicated by 141. The same approach is applicable to PE-routers 145, 147, and 149 as shown in FIG. 4.

A result of implementing an embodiment of the present invention is that packets destined from AS 110 to AS 150 will be properly routed. Likewise, the return traffic from AS 150 to AS 110 will be properly routed. In addition, load balancing is preserved without causing the routing loop.

Figure 5:
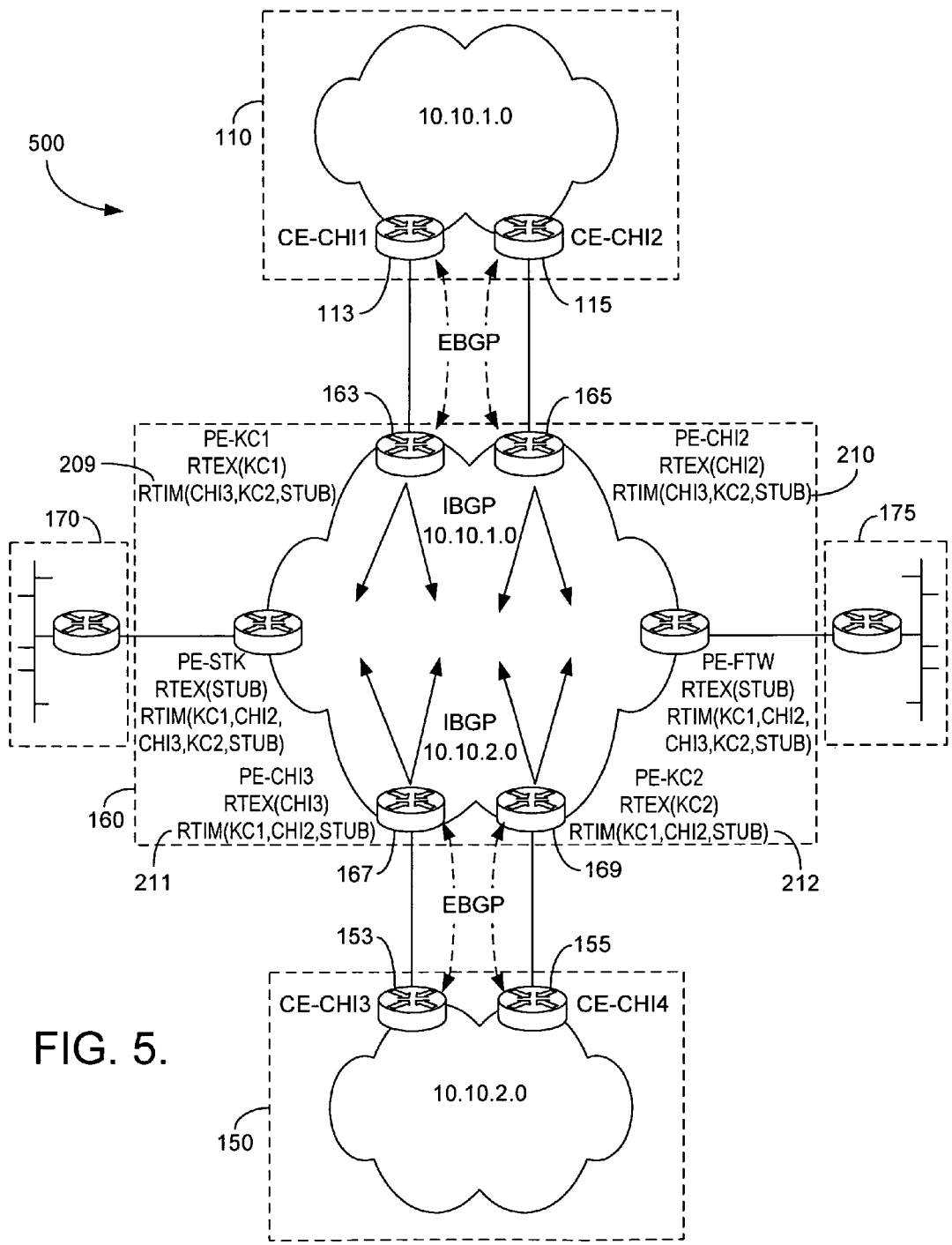
FIG. 5 is a block diagram of a first exemplary routing loop prevention network with stub sites suitable for practicing an embodiment of the present invention.

Turning now to FIG. 5, a block diagram of an exemplary route loop prevention network 500 is shown with a stub site (also called stub AS) 170 and a stub site 175. Stub sites 170 and 175 are connected to an SP 160. SP 160 is a representation of SP 140 with added stub sites. For an embodiment of the present invention, the route import and export statements take into account the routes to and from stub sites 170 and 175. For the above example with PE-router 143 which is now shown as a PE-router 163, RTim 209 may contain an added route import statement for a stub as indicated by RTim (CHI3,KC2, Stub). The same approach is applicable to the remaining PE-routers 165, 167, and 169 which were shown earlier as PE-routers 145, 147, and 149. FIG. 5 indicates a possibility of a large scale deployment.

Figure 6:
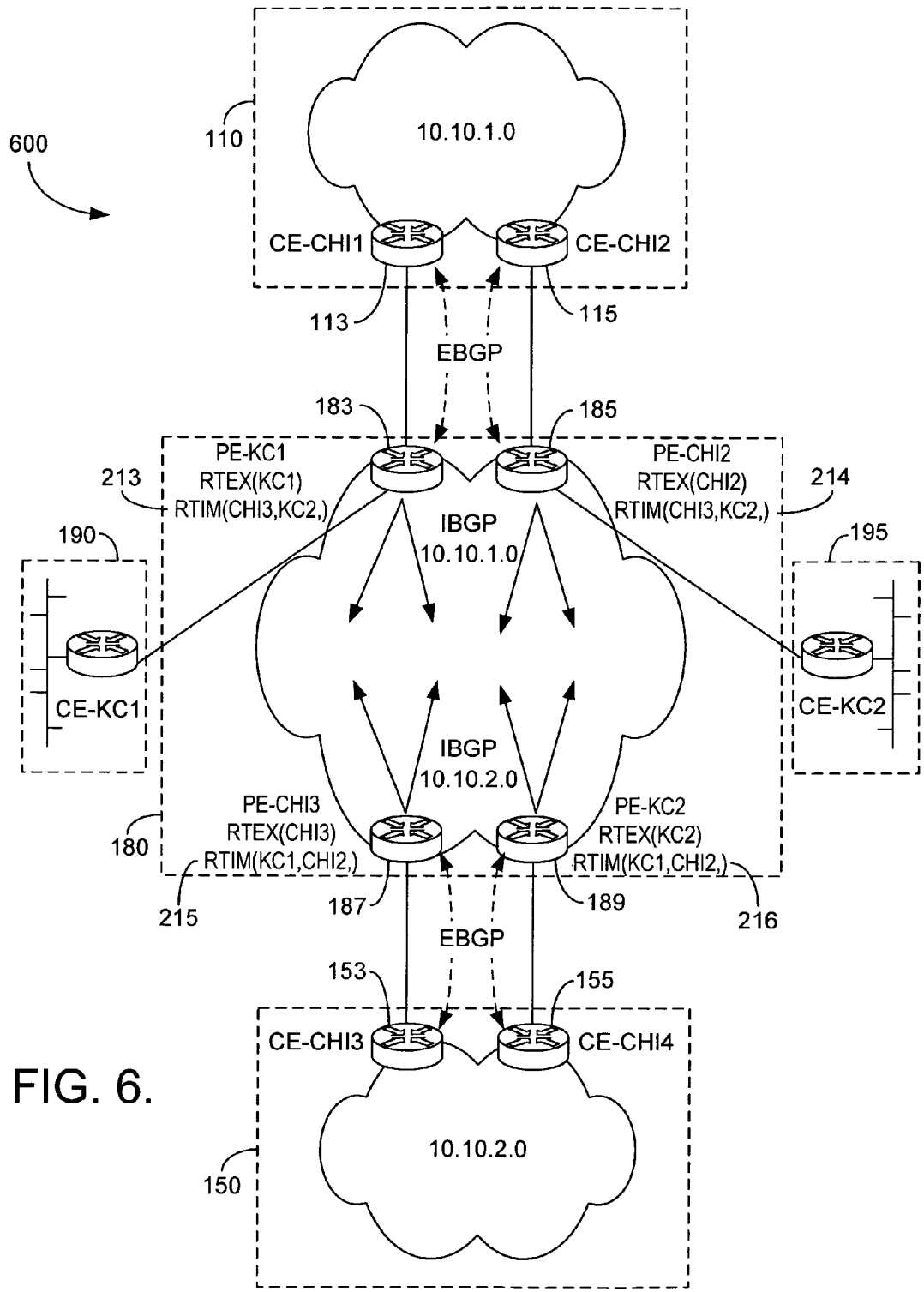
FIG. 6 is a block diagram of a second exemplary routing loop prevention network with stub sites suitable for practicing an embodiment of the present invention.

Unfortunately, a service provider may have a limited number of PE-routers to deploy in its network. In this case, it is more likely that multihomed as may share PE-routers with stub sites. FIG. 6 indicates such a configuration. In contrast to FIG. 5, where stub sites 170 and 175 were connected to dedicated PE-routers, a stub site 190 and a stub site 195 share PE-routers with AS 110 and AS 150. For an embodiment of the present invention, the route import and statements take into account the routes to and from stub sites 190 and 195. For the above example with PE-router 163 which is now shown as a PE-router 183, RTim 213 may not contain a route import statement for stub site 190 as indicated by RTim (CHI3,KC2) which looks like RTim 201. The reason for this change is that routes between a stub site and a PE-router are static as was shown with CE-router 133 and PE-router 127 in FIG. 1. There is no need to have route import and export statements for stub sites when the routes can only traverse one path. The same approach is applicable to the remaining PE-routers 185, 187, and 189 which were shown earlier as PE-routers 165, 167, and 169.

With the configuration shown in FIG. 6, PE-routers 183 and 189 respectively use one VRF table to handle routes for both their corresponding AS and stub site. The VRF table would hold the route import and export statements as explained above. With the manipulation of the route import and export statements as discussed above, stub sites 190 and 195 may encounter a problem of not being able to route packets if links between PE-router 183 and CE-router 113, and between PE-router 189 and CE-router 155 are broken. There will be no failover to PE-routers 185 and 187. The manipulation of the route import statements prevents iBGP routes. For example, if a link between PE-router 183 and CE-router 113 is lost, stub site 190 cannot route or receive packets. To solve this problem, a multi-VRF solution is implemented as another embodiment of the present invention in FIG. 7.

Figure 7:
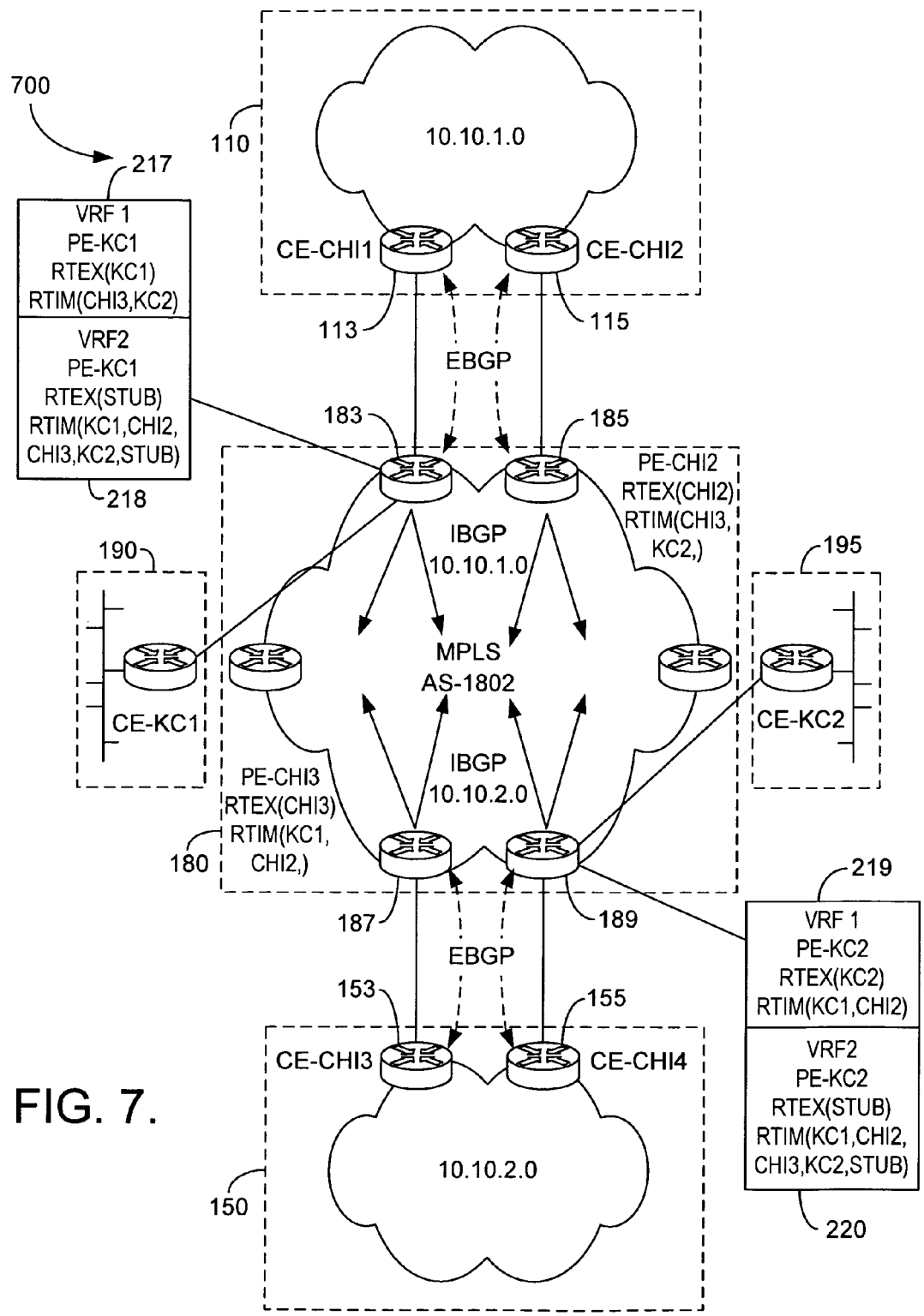
FIG. 7 is a block diagram of an exemplary routing loop prevention network with stub sites and additional VRF table suitable for practicing an embodiment of the present invention.

In FIG. 7, the previously discussed embodiments of the present invention are maintained. However, a second VRF table 218 and a second VRF table 220 are implemented respectively in PE-routers 183 and 189 to enable stub sites 190 and 195 to route packets in the event a failure condition would occur at the links between PE-router 183 and CE-router 113, and PE-router 189 and CE-router 155. For example, if the link between PE-router 183 and CE-router 113 fails to operate, or if CE-router 113 fails altogether, AS 110 may still route to stub site 190 through PE-router 185. This solution preserves the prevention of the routing loops between PE-routers 183 and 185 and allows routes for stub site 190, including when a failure condition occurs. The same approach applies to PE-routers 187 and 189 and stub site 195.

Figure 8:
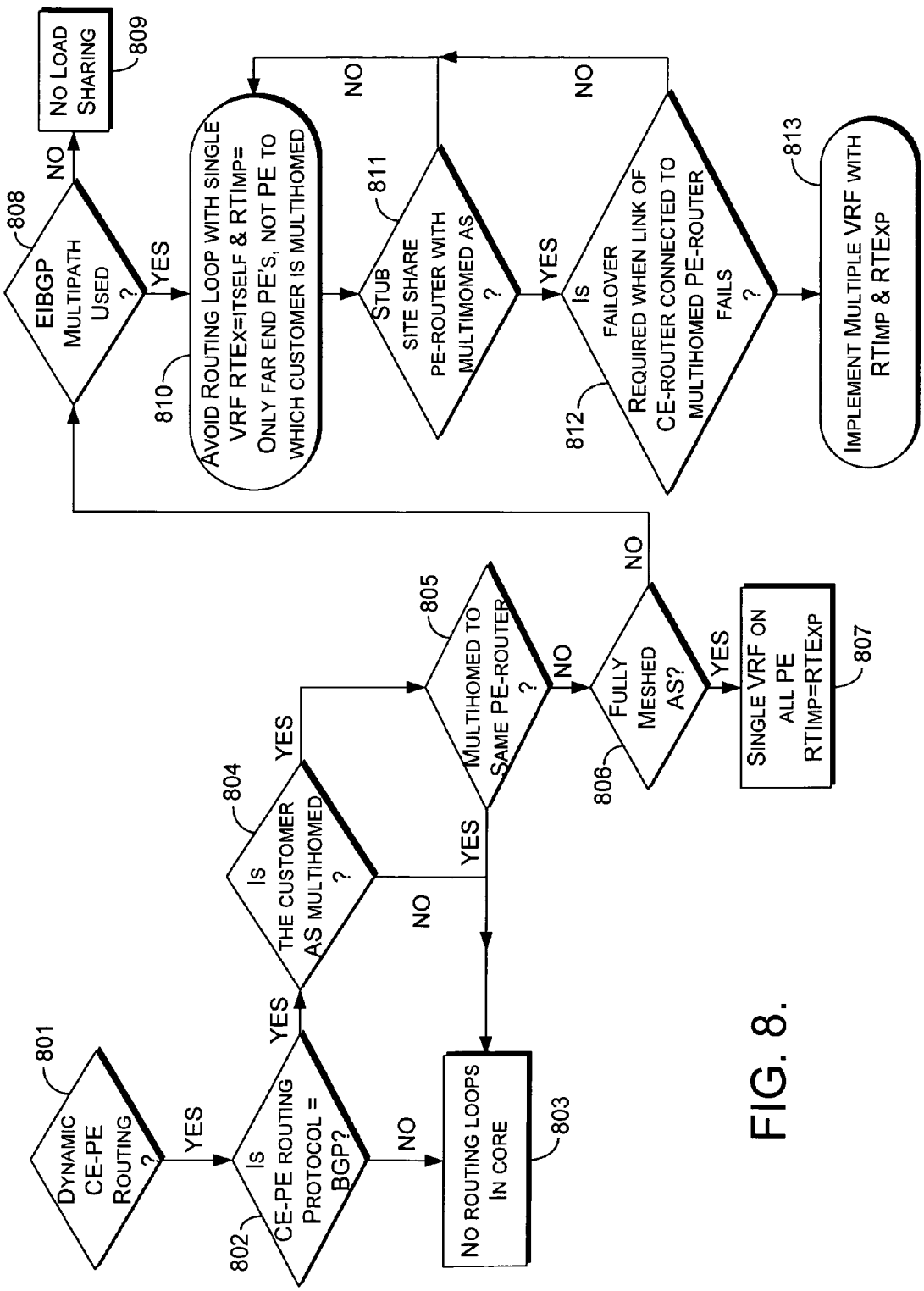
FIG. 8 is a flowchart of an exemplary process for preventing routing loops when practicing an embodiment of the present invention.

Referring now to FIG. 8, an exemplary process for preventing routing loops is shown in a method 800. In a step 801, a determination is made whether there is CE-PE routing between the CE-routers and PE-routers. If yes, another determination is made whether the routers use BGP as a protocol in a step 802. If BGP is not the routing protocol, there may be no routing loops as shown in a step 803. If BGP is the routing protocol, another determination is made whether a customer is multihomed in a step 804. As shown in FIG. 1, this means that AS 110, through CE-routers 113 and 115, would be connected to SP 120 through PE-routers 123 and 125. If the customer is not mulithomed then there may be no routing loops as shown in step 803. If the customer is multihomed, a determination is made whether the customer is multihomed to the same PE-router in a step 805. Although not shown in the figures, an AS may be multihomed to one PE-router. If the answer is yes, there may be no routing loops as shown in step 803. If the answer is no, a determination is made whether the AS is fully meshed in a step 806. A fully meshed AS is one where all the route import statements equal the route export statements. If the answer is yes, a step 807 indicates a single VRF table is implemented on the PE-routers with the route import statements equal to the route export statements. If the answer is no, another determination is made whether eiBGP multipath is used in a step 808. If the answer is no, there may be no load balancing in a step 809 and consequently no routing loops in step 803 (connection not shown).

For step 808, if the answer is yes, routing loops have to be avoided by manipulating a VRF table in the PE-routers as shown in a step 810 and identified above in FIG. 4. A determination is made if a stub site shares a PE-router with a multihomed AS in a step 811 and shown in FIG. 6. If the answer is no, step 810 is again implemented. If the answer is yes, a determination is made whether a failover solution needs to be implemented in a step 812. If the answer is no, step 810 continues to be applicable. If the answer is yes, a second VRF table may be implemented in the PE-routers in a step 813 and shown in FIG. 7.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for preventing routing loops in a communications network, comprising:
  receiving data at a first router in a service provider network, the first router being a member of a set of routers in the service provider network associated with a common autonomous system (AS), wherein the AS is multihomed to the service provider network by way of the set of routers;
  determining one or more other routers from the set of routers associated with the AS;
  modifying a virtual routing and forwarding (VRF) table associated with each of the members of the set of routers in the service provider network associated with the AS to prevent a routing loop between the set of routers; and
  providing for the communication of the data to a second router of the service provider network, wherein the second router is not a member of the set of routers associated with the AS.

2. The method of claim 1, wherein providing for the communication of the data to the second router comprises modifying a route import statement of the second router to accept routes from the first router.

3. The method of claim 2, further comprising providing a unique route export statement to each member of the set of routers and the second router.

4. The method of claim 3, wherein a subset of the set of routers implement eiBGP multipath.

5. The method of claim 1, wherein the modification of the VRF table includes preventing iBGP routes from occurring between the set of routers.

6. The method of claim 1 further comprising load balancing the data among the set of routers.

7. A method for preventing routing loops in an External and Internal Border Gateway Protocol (eiBGP)-enabled packet network, comprising:
  implementing eiBGP multipath among two or more Provider Edge (PE)-routers in a service provider network; and
  preventing Internal Border Gateway Protocol (iBGP) routes between the two or more PE-routers, wherein an autonomous system (AS) is multihomed to service provider network by way of the two or more PE-routers.

8. The method of claim 7, wherein preventing iBGP routes comprises controlling route import and export statements.

9. The method of claim 7 further comprising load balancing between the two or more PE-routers.

10. A method for preventing routing loops in an eiBGP-enabled packet network, comprising:

modifying route import statements in at least one of two or more PE-routers of a service provider network to not accept routes between a set of the two or more PE-routers of the service provider network that are connected to the same autonomous system (AS), wherein the AS is multihomed to the service provider network by way of the set of the two or more PE-routers; and providing a unique route export statement to the two or more PE-routers of the service provider network to which the AS is multihomed.

11. The method of claim 10, further comprising modifying route import statements in a virtual routing and forwarding (VRF) table.

12. The method of claim 10, further comprising modifying route export statements in the VRF table.

13. The method of claim 10, wherein modifying the route import statements prevents iBGP routes from occurring between the set of the two or more PE-routers of the service provider network to which the AS is multihomed.

14. A method for preventing routing loops among multihomed autonomous systems (ASs) without blocking routes to stub sites, comprising:

with eiBGP multipath enabled in one or more PE-routers of a service provider network, modifying route import statements in a first virtual routing and forwarding (VRF) table in one or more PE-routers to match across the one or more PE-routers except where two or more PE-routers are connected to the same autonomous system (AS), wherein the AS is multihomed to the service provider network by way of the two or more PE-routers;

providing a unique route export statement to the one or more PE-routers; and implementing a second VRF table to allow one or more stub sites to route packets without restriction from the first VRF table, wherein the stub sites route packet into the service provider network by way of at least one of the two or more PE-routers that are connected to the same AS.

15. The method of claim 14, wherein implementing the second VRF table comprises implementing the second VRF table in each of the one or more PE-routers respectively connected to the one or more stub sites.

16. The method of claim 14, wherein modifying route import statements prevent iBGP routes from occurring between the two or more PE-routers connected to the same AS.

17. A system for preventing routing loops in an eiBGP-enabled packet network, comprising:

two or more PE-routers of a service provider network in communication with one or more autonomous systems (ASs);

the two or more PE-routers operable to modify route import statements to match across the two or more PE-routers except where a set of the two or more PE-routers are connected to the same autonomous system (AS), wherein the AS is multihomed to the service provider network by way of the two or more PE-routers; and the set of two or more PE-routers operable to contain unique route export statements that prevent iBGP routes from occurring among the set of the two or more PE-routers.

18. The method of claim 17, further comprising the two or more PE-routers operable to modify route import statements in a virtual routing and forwarding (VRF) table.

19. The method of claim 17, further comprising the two or more PE-routers operable to modify route export statements in the VRF table.

20. A system for preventing routing loops among multihomed autonomous systems (as) without blocking routes to stub sites, comprising:

two or more PE-routers of a service provider network in communication with one or more ASs, wherein a first set of the two or more PE-routers are operable to enable eiBGP multipath when connected to the same autonomous system (AS);

the two or more PE-routers operable to modify route import statements in a first virtual routing and forwarding (VRF) table in the two or more PE-routers to match across the two or more PE-routers except where a first group of two or more of the two or more PE-routers are connected to the same AS, wherein the AS is multihomed to the service provider network by way of the first group of two or more PE-routers;

the two or more PE-routers operable to contain unique route export statements; and a second group of the two or more PE-routers operable to implement a second VRF table to allow one or more stub sites to route packets without restriction from the first VRF table.

21. The system of claim 20, further comprising the second group of the two or more PE-routers operable to implement the second VRF table in the second group of the two or more PE-routers respectively connected to the one or more stub sites.

* * * * *